US006384962B1

United States Patent
Foursa et al.

(10) Patent No.: US 6,384,962 B1
(45) Date of Patent: May 7, 2002

(54) METHOD AND APPARATUS TO PERFORM AUTOMATIC GAIN EQUALIZATION USING RAMAN AMPLIFIERS

(75) Inventors: Dimitri Foursa, Freehold, NJ (US); Bo Pedersen, Annapolis, MD (US)

(73) Assignee: TyCom (US) Inc., Morristown, NJ (US)

( * ) Notice: Subject to any disclaimer, the term of this patent is extended or adjusted under 35 U.S.C. 154(b) by 17 days.

(21) Appl. No.: 09/589,214

(22) Filed: Jun. 7, 2000

(51) Int. Cl.$^7$ ................................................ H01S 3/00
(52) U.S. Cl. ...................................................... 359/334
(58) Field of Search ............................. 359/334, 337.4, 359/341.41; 372/3

(56) References Cited

U.S. PATENT DOCUMENTS

| | | | |
|---|---|---|---|
| 5,111,334 A | | 5/1992 | Heidermann ................ 359/341 |
| 6,038,356 A | | 3/2000 | Kerfoot, III et al. .......... 385/24 |
| 6,052,219 A | | 4/2000 | Kidorf et al. ................ 359/334 |
| 6,055,092 A | * | 4/2000 | Sugaya et al. ............... 359/337 |
| 6,081,366 A | * | 6/2000 | Kidorf et al. ................ 359/341 |
| 6,088,152 A | * | 7/2000 | Berger et al. ................ 359/334 |
| 6,172,803 B1 | * | 1/2001 | Masuda et al. .............. 359/341 |

OTHER PUBLICATIONS

Masuda et al. "Review of Wideband Hybrid Amplifiers", Optical Fiber Communications Conference 2000, Mar. 7–10, 2000, vol. 1, pp. 2–4.*
Walker, Kenneth, "Status and Challenges of Optical Fiber Amplifiers and Lasers", OSA Trends in Optics and Photnics Series edited by Baney et al., 1998, pp. 5–17.*
Kawai et al., "Wide–Bandwidth and Long–Distance WDM Transmission Using Highly Gain–Flattened Hybrid Amplifier", IEEE Photonics Technology Letters, vol. 11, No. 7, Jul. 1999.*

* cited by examiner

Primary Examiner—Thomas H. Tarcza
Assistant Examiner—Deandra M. Hughes

(57) ABSTRACT

A method and apparatus to perform automatic gain equalization for a lightwave communications system is described. A first amplifier amplifies an optical signal to produce a first gain curve having a first gain maxima and a first gain minima of a first period. A second amplifier amplifies the optical signal to produce a second gain curve with a second gain maxima and a second gain minima of a second period, with the second gain maxima substantially coinciding with the first gain minima.

14 Claims, 7 Drawing Sheets

METHOD AND APPARATUS TO PERFORM AUTOMATIC GAIN EQUALIZATION USING RAMAN AMPLIFIERS

FIELD OF THE INVENTION

The invention relates to communications in general. More particularly, the invention relates to a method and apparatus to automatically perform gain equalization in an optical transmission system utilizing a plurality of optical amplifiers such as raman amplifiers.

BACKGROUND OF THE INVENTION

Optical fiber amplifiers are fundamentally important to long-haul optical communications systems. Optical signals begin to attenuate as they travel over an optical fiber transmission medium due to a variety of factors such as fiber loss and dispersion. Optical amplifiers help compensate for such attenuation by providing additional power to the optical signal as it moves through the system.

There are two general classes of optical amplifiers. The first class of optical amplifiers is referred to as lumped amplifiers. Lumped amplifiers linearly increase optical signal power of a supplied input signal via stimulated emission of fiber dopants such as erbium that is subject to an optical pump source. An example of a lumped amplifier would be an Erbium Doped Fiber Amplifier (EDFA). The second class of optical amplifiers is referred to as distributed amplifiers. Distributed amplifiers increase optical signal power along the signal transmission path. An example of a distributed amplifier is a raman amplifier. Although each class of amplifiers has its own advantages and disadvantages, distributed amplifiers in general, and raman amplifiers in particular, are highly desirable since they offer potentially lower noise levels and higher potential bandwidth than lumped amplifiers.

Raman amplification is accomplished by introducing the signal and pump energies along the same optical fiber. The pump and signal may be copropagating or counterpropagating with respect to one another. A raman amplifier uses Stimulated Raman Scattering (SRS), which occurs in silica fibers when an intense pump beam propagates through it. SRS is an inelastic scattering process in which an incident pump photon loses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength.

FIG. 1 (PRIOR ART) is a plot illustrating the relationship between the pump energy and the raman gain for a silica fiber. The particular wavelength of the pump energy that is used in this example is denoted by reference numeral 1. As shown in FIG. 1, the gain spectrum 2 for this particular pump wavelength is shifted in wavelength with respect to the pump wavelength. Consequently, the bandwidth of the raman amplifier is limited. For example, the bandwidth of the amplifier shown in FIG. 1 is only about 20 nanometers (nm) at a gain of 10 decibels (dB).

FIG. 2 (PRIOR ART) is a plot illustrating the relationship between the pump energy from multiple pumps and the raman gain for a silica fiber. One technique to increase the bandwidth of a raman amplifier is through the use of multiple pumps operating at different wavelengths. As shown in FIG. 2, pump energy supplied at a wavelength denoted by reference numeral 202 generates a gain curve 204 while pump energy supplied at a wavelength denoted by reference numeral 206 generates gain curve 208. The composite gain spectrum, indicated by curve 210, has a bandwidth that is greater than either of the individual gain curves 204 and 208.

One problem associated with a raman amplifier using multiple pumps, however, is that the gain curve for each pump is shifted with respect to adjacent gain curves. This result is due to the use of different wavelengths for each pump. Consequently, the different pump wavelengths generate gain curves having different gain maxima thereby creating an uneven gain signal. This uneven gain signal is sometimes referred to as a "gain ripple."

Conventional systems attempt to compensate for the gain ripple using a variety of techniques. These techniques, however, are unsatisfactory for a number of reasons. For example, one technique is to use a multistage amplifier wherein each stage uses different fiber lengths, different dopants, fibers of different geometry, or pumping power. Each of these factors, however, is imprecise in terms of controlling the amount of gain per stage and therefore the composite gain signal. The technique of varying gain curves by varying the type or quantity of dopants is particularly complex and inaccurate. Furthermore, multistage amplifiers are inherently more complex and expensive to build and deploy in a lightwave system. Another technique is to utilize an equalizer or optical filter for each amplifier. This technique, however, requires additional components and therefore adds complexity and expense to the system.

In view of the foregoing, it can be appreciated that a substantial need exists for a method and apparatus that solves the above-discussed problems.

SUMMARY OF THE INVENTION

The embodiments of the invention include a method and apparatus to perform automatic gain equalization for an optical communications system. A first amplifier amplifies an optical signal to produce a first gain curve having a first gain maxima and a first gain minima of a first period. A second amplifier amplifies the optical signal to produce a second gain curve with a second gain maxima and a second gain minima of a second period, with the second gain maxima substantially coinciding with the first gain minima.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The embodiments of the invention comprise a method and apparatus to equalize gain performance of each channel in a long-haul optical communication system utilizing a plurality of optical amplifiers. In one embodiment of the invention, the optical amplifiers are raman amplifiers using multiple pumps operating at multiple wavelengths. Each amplifier utilizes specific wavelengths shifted to compensate for the gain ripple produced by another amplifier in the system. Consequently, the composite gain curve across the entire system is smoothed or equalized automatically without the need for complex amplifiers and added components such as equalizers or optical filters.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
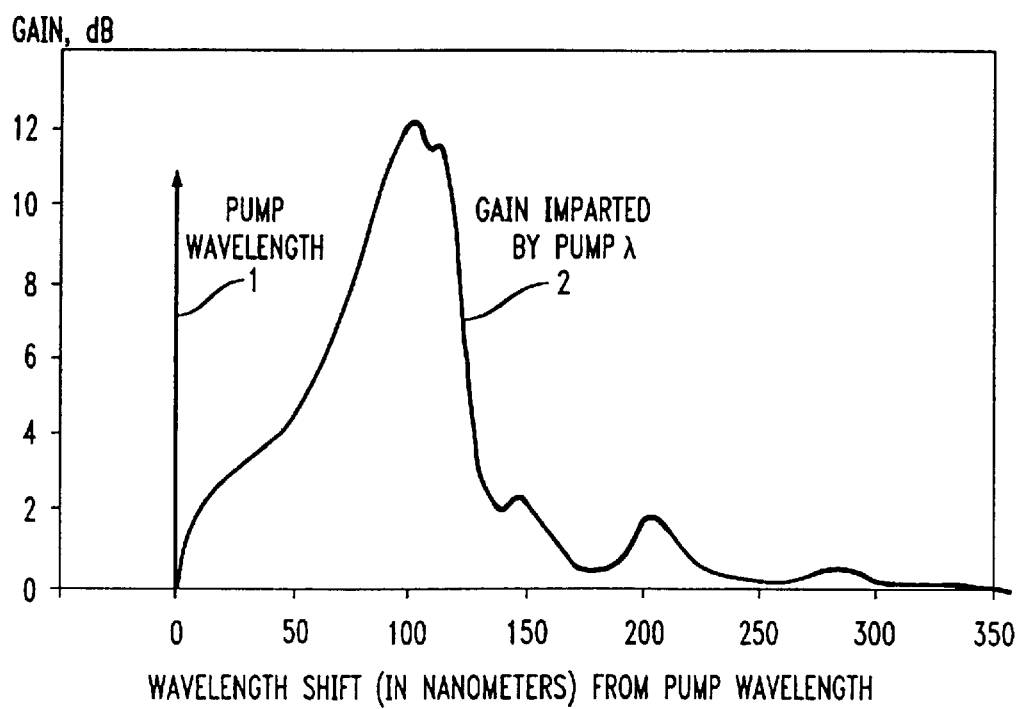
FIG. 1 (PRIOR ART) is a plot illustrating the relationship between the pump energy and the raman gain for a silica fiber.
Figure 2:
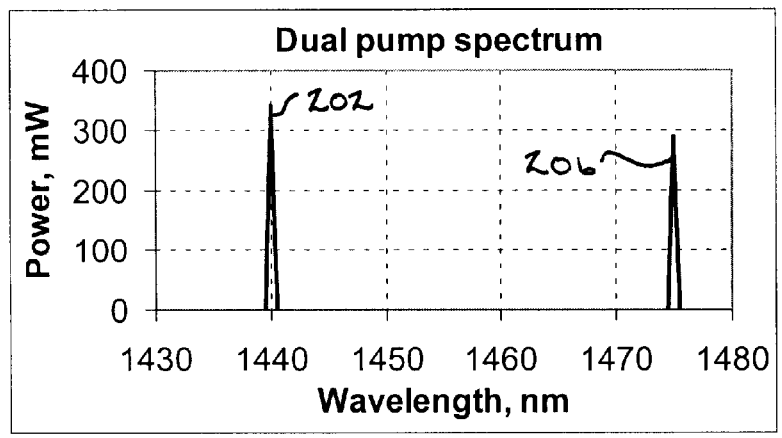
FIG. 2 (PRIOR ART) is a plot illustrating the relationship between the pump energy from multiple pumps and the raman gain for a silica fiber.
Figure 2:
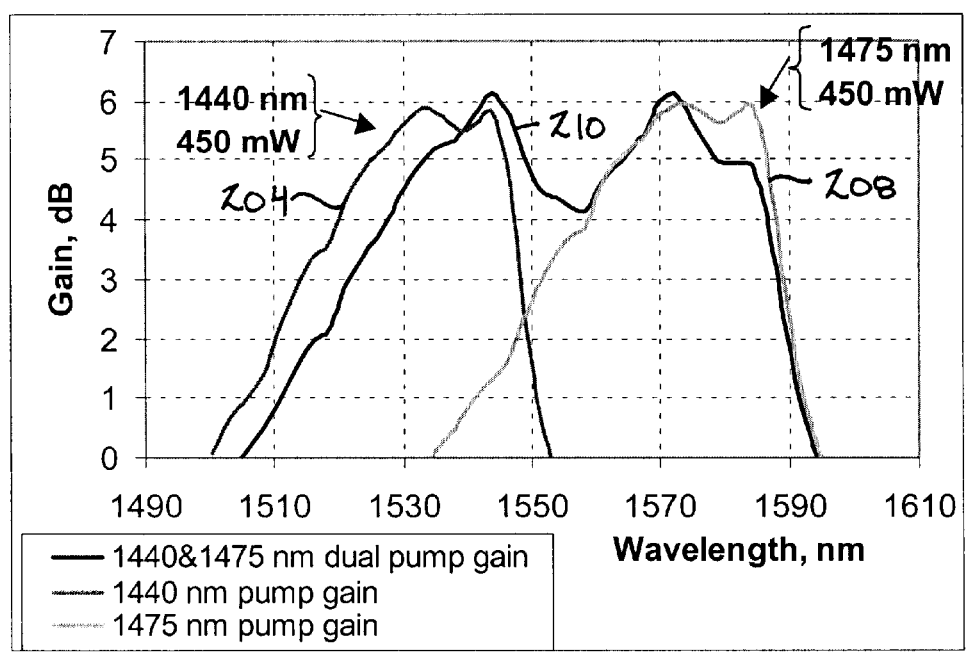
Figure 3:
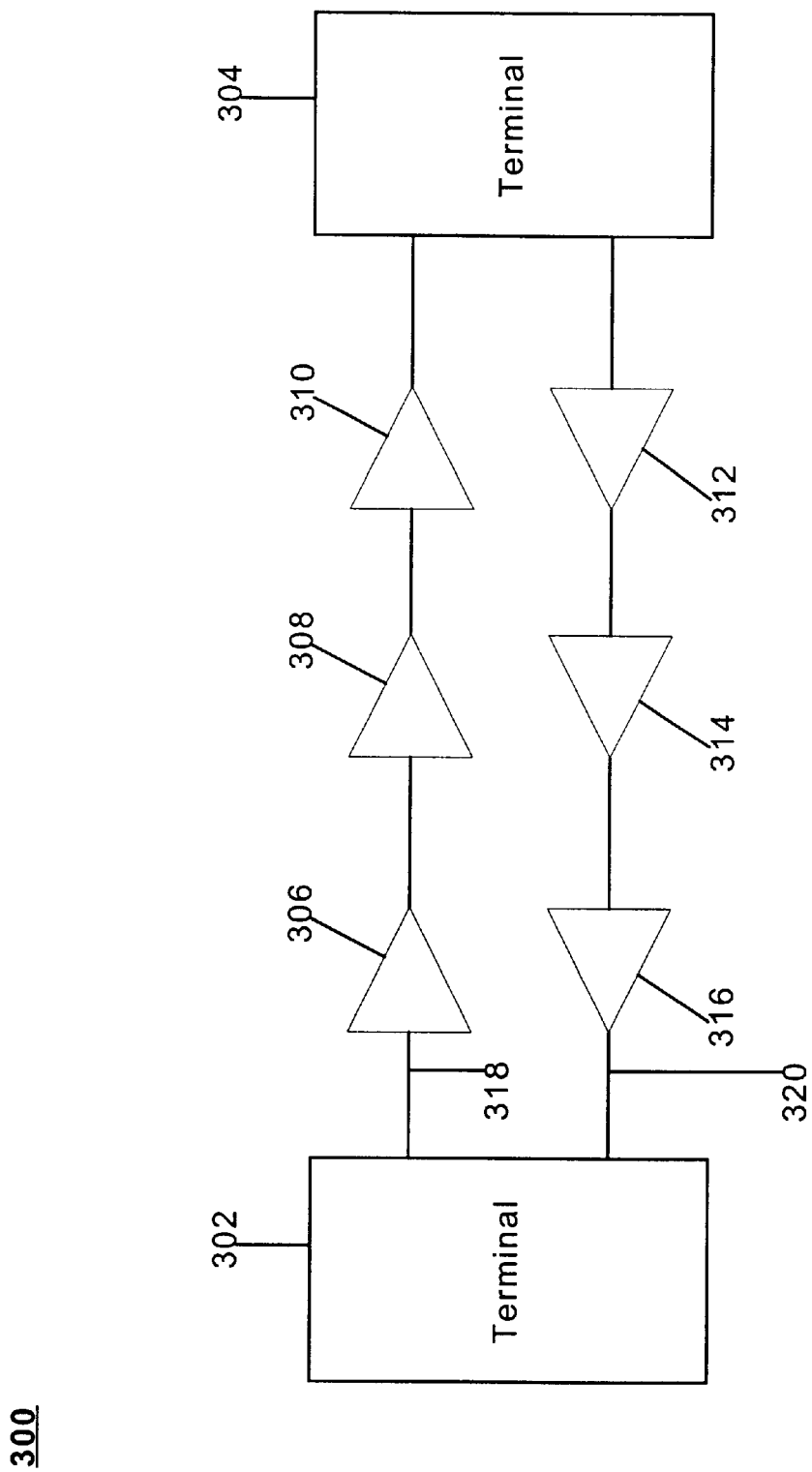
FIG. 3 is a block diagram of a system suitable for practicing one embodiment of the invention.

Referring now in detail to the drawings wherein like parts are designated by like reference numerals throughout, there is illustrated in FIG. 3 a system suitable for practicing one embodiment of the invention. FIG. 3 discloses an optical communication system 300 that utilizes optical fiber amplifiers such as raman amplifiers. The system includes transmitter/receiver ("transceiver") terminals 302 and 304 and optical transmission fiber paths 318 and 320 supporting bidirectional communication. The signals being transmitted from terminals 302 and 304 are in optical form. There is no intermediate conversion to electrical form.

A plurality of optical amplifiers 306, 308, 310, 312, 314 and 316 are interposed in fiber paths 318 and 320 between terminals 302 and 304. Optical amplifiers 306, 308, 310, 312, 314 and 316 each contain a length of fiber that provides a gain medium, an energy source that pumps the fiber to provide gain, and a means of coupling the pump energy into the fiber without interfering with the signal being amplified. In the case of raman amplifiers, the fiber providing the gain medium is the transmission path itself. These components of the optical amplifiers are shown in greater detail in FIG. 4. For clarity of discussion, fiber paths 318 and 320 are shown with only three optical amplifiers each. It can be appreciated, however, that any number of optical amplifiers may be employed in each path and still fall within the scope of the invention.

Figure 4:
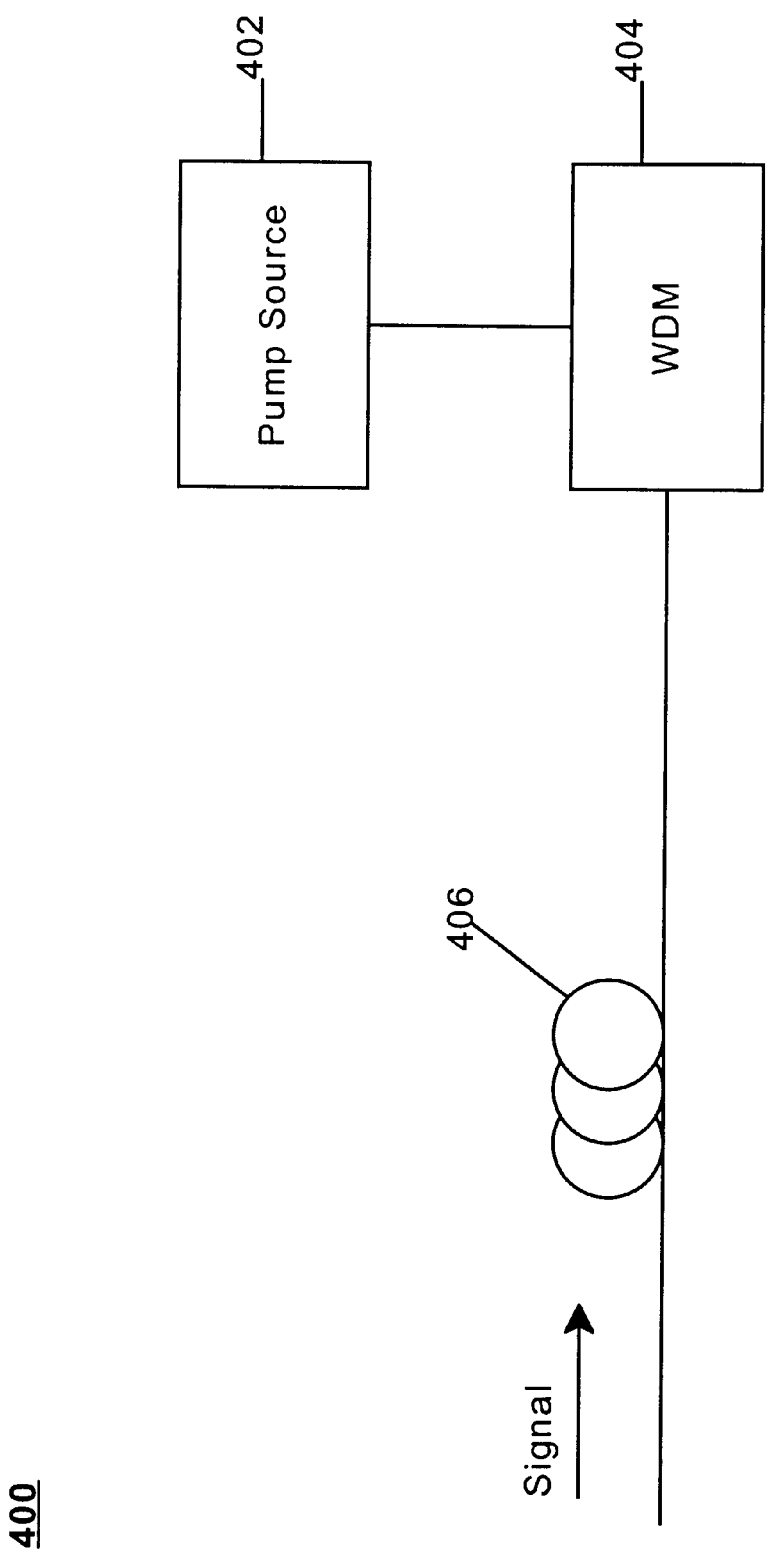
FIG. 4 is a block diagram of an optical amplifier in accordance with one embodiment of the invention.

FIG. 4 is a block diagram of an optical amplifier in accordance with one embodiment of the invention. FIG. 4 illustrates an optical amplifier 400 which is representative of optical amplifiers 306, 308, 310, 312, 314 and 316, as discussed with reference to FIG. 3. Optical amplifier 400 includes an optical fiber portion 406 of the transmission path in which raman gain is to be generated. This portion 406 of fiber may vary in size and may be limited, for example, to a small section of the transmission path. Alternatively, fiber portion 406 in which raman gain is generated may have a length encompassing the entire transmission path. Fiber portion 406 is coupled to a source of optical pump energy 402 via a coupler 404 such as a wavelength division multiplexer (WDM).

Figure 5:
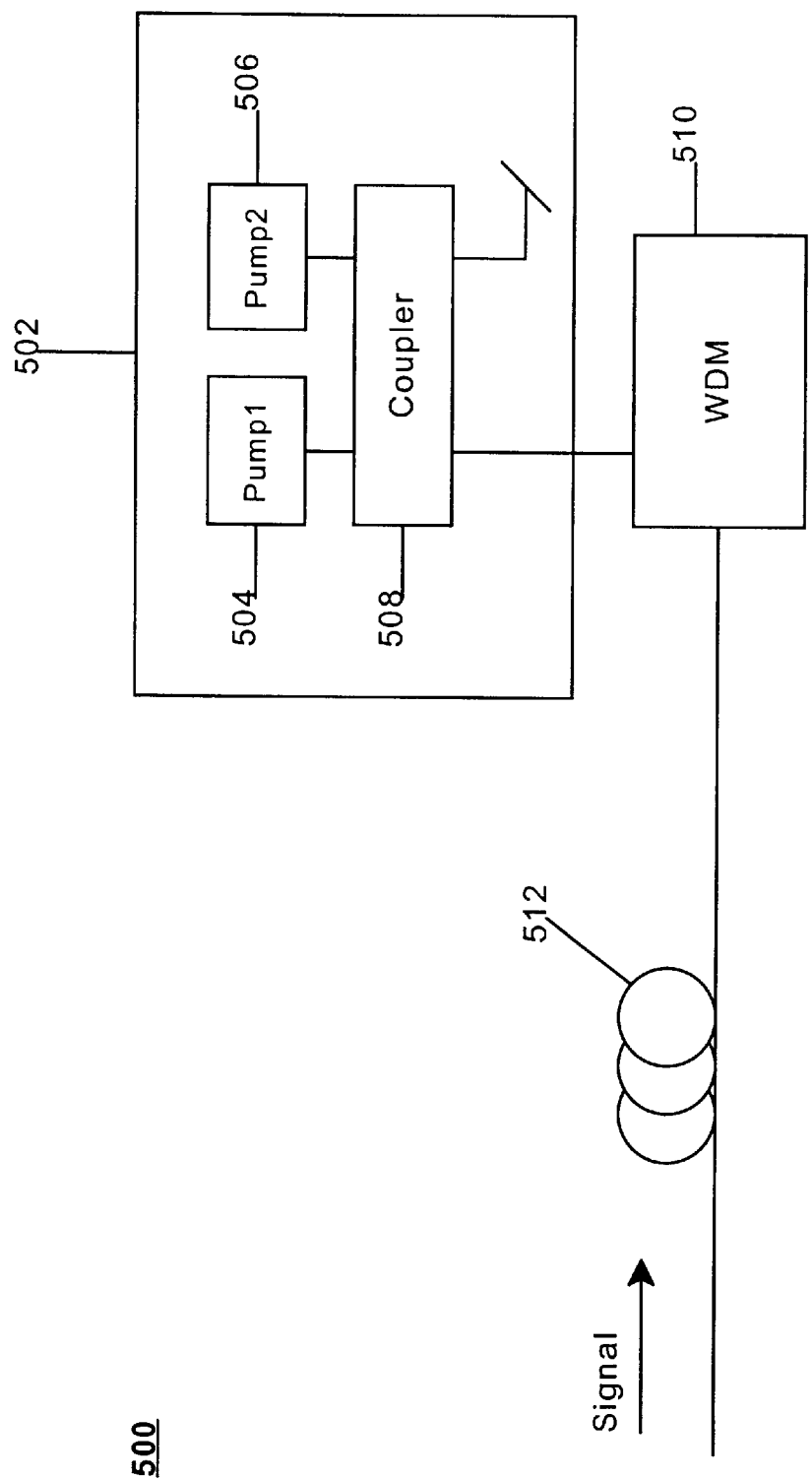
FIG. 5 is a block diagram of an optical amplifier with a pump source in accordance with one embodiment of the invention.

FIG. 5 is a block diagram of an optical amplifier with a pump source in accordance with one embodiment of the invention. FIG. 5 illustrates an optical amplifier 500 having a pump source 502, an optical coupler 510 and an optical fiber portion 512. Optical coupler 510 and optical fiber portion 512 are similar to optical coupler 404 and optical fiber portion 406, respectively, as discussed with reference to FIG. 4. Pump source 502 is representative of pump source 402, as discussed with reference to FIG. 4. Pump source 502 comprises a first optical pump 504 and a second optical pump 506. An optical coupler 508 combines the energy from pumps 504 and 506 and directs the resulting beam to WDM coupler 510. As previously explained, the pumps 504 and 506 generate pump energy at different wavelengths selected to maximize the amplifier bandwidth. For example, pump 504 may provide pump energy at 1455 nm and pump 506 may provide pump energy at 1495 nm to amplify a WDM signal ranging from 1530–1610 nm. Although only two pumps are described with reference to pump source 502, it can be appreciated that any number of pumps can be used and still fall within the scope of the invention.

Systems 300, 400 and 500 operate to perform automatic gain equalization for each communication channel used by system 300. One or more optical signals are communicated between terminals 302 and 304 via optical fiber paths 318 and/or 320. As the optical signals travel through the system they are attenuated due to various factors such as fiber loss and dispersion. Amplifiers 306, 308, 310 help compensate for this attenuation for optical fiber path 318, while amplifiers 312, 314 and 316 help compensate for this attenuation for optical fiber path 320. As stated previously, amplifiers 400 and 500, which are representative of amplifiers 306, 308, 310, 312, 314 and 316, are raman amplifiers using multiple pumps to increase the bandwidth for any given channel.

Terminal 304 sends one or more signals to terminal 306 via optical fiber path 318. The optical signal is received and amplified by a first amplifier (e.g., amplifier 306). The first amplifier amplifies the optical signal to produce a first gain curve having a first gain maxima and a first gain minima of a first period. The first amplifier sends the amplified optical signal to a second amplifier (e.g., amplifier 308). The second amplifier receives the amplified optical signal. The second amplifier then amplifies the amplified optical signal to produce a second gain curve with a second gain maxima and a second gain minima of a second period. The second gain maxima of the second gain curve substantially coincides with the first gain minima of the first gain curve. Similarly, the second gain minima of the second gain curve substantially coincides with the first gain maxima of the first gain curve. This is accomplished by shifting the wavelengths used by the pumps for the second amplifier relative to the wavelengths used by the pumps for the first amplifier. The shifting of wavelengths results in gain being applied by the second amplification to those particular areas of the optical signal that did not receive sufficient gain during the first amplification. Consequently, the composite gain curve for the entire system 300 is equalized when the optical signal is received at terminal 306. The shifting concept used herein may be better understood with reference to FIGS. 6 and 7.

It is worthy to note that the terms "substantially coinciding" or "substantially coincides" as used herein mean that the gain maxima at a given wavelength of one amplifier overlaps or is adjacent to the gain minima at the same or adjacent wavelength of another amplifier, and vice-versa. The term "adjacent" as used above means any point or wavelength between two sequential gain maximas for a given gain curve.

Figure 6:
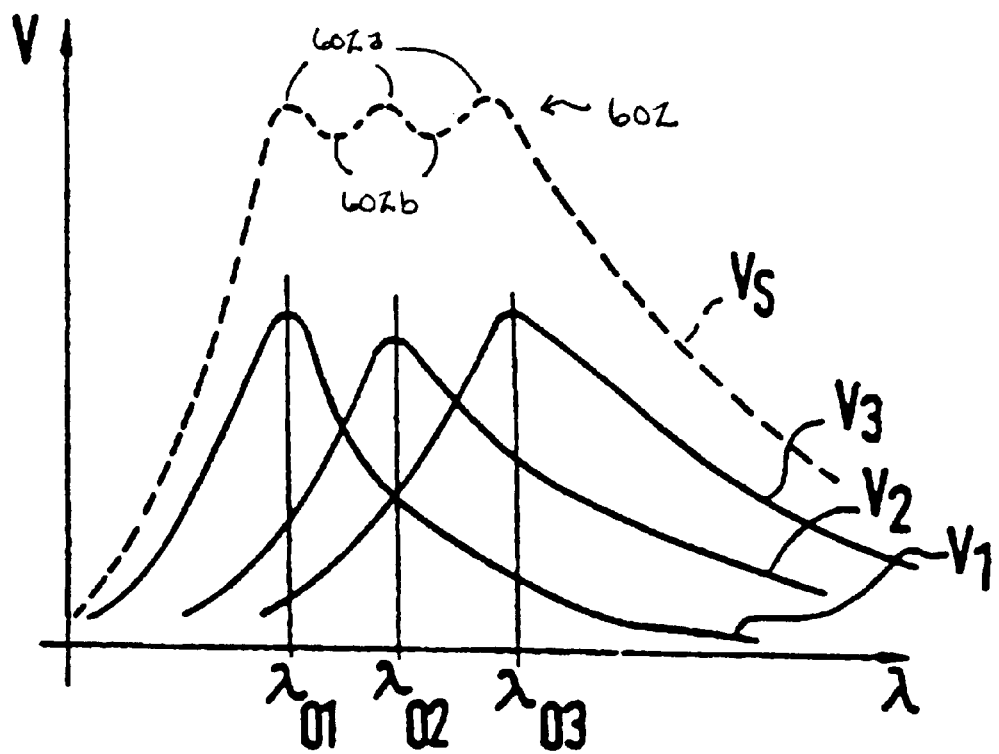
FIG. 6 is a plot of a composite gain curve for a multi-pump raman amplifier in accordance with one embodiment of the invention.

FIG. 6 is a plot of a composite gain curve for a multi-pump raman amplifier in accordance with one embodiment of the invention. Each pump operates at a different wavelength $\lambda 01, \lambda 02, \ldots, \lambda 0n$ of the light signal thereby producing a different gain curve designated as V1, V2, ..., Vn. The different wavelength positions of gain characteristics V1, V2, ..., Vn of the individual amplifier pumps produce a composite gain curve VS at the signal output of the raman amplifier. The composite gain curve VS is the sum of the individual characteristics V1+V2+...+Vn, and forms a gain ripple 602. The gain ripple is periodic in nature and includes a gain maxima 602a and a gain minima 602b. It can be appreciated that the magnitude of the maximum gain and its gain ripple are dependent on the number of pumps used by the raman amplifier.

Figure 7:
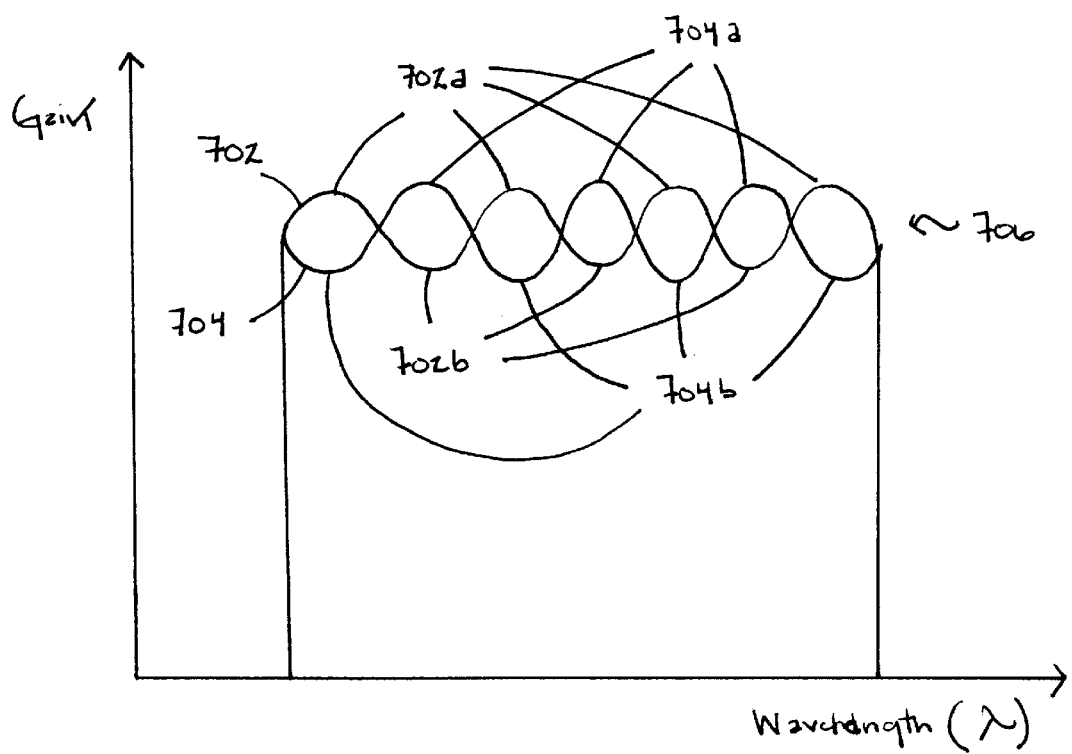
FIG. 7 illustrates a combined gain curve derived from a pair of gain curves produced by a pair of raman amplifiers in accordance with one embodiment of the invention.

FIG. 7 illustrates a combined gain curve derived from a pair of gain curves produced by a pair of raman amplifiers in accordance with one embodiment of the invention. FIG. 7 illustrates a first gain curve VS1 combined with a second gain curve VS2. VS1 is representative of the first gain curve produced by a first amplifier as discussed with reference to FIG. 6. VS2 is representative of a second gain curve produced by a second amplifier adjacent to the first amplifier. Each pump of the second amplifier operates at a wavelength that is shifted approximately 1 to 50 nm, and advantageously 5–10 nm, from the corresponding pump of the first amplifier. The actual shift in wavelength varies according to the number of pump wavelengths used by the amplifier and the total bandwidth of the amplifier. For example, a second amplifier having a bandwidth of 20 nm using two pumps producing gain curves with a period of 10 nm may be shifted approximately 5 nm from the corresponding pumps of the first amplifier. Since the pump wavelengths are shifted in the second amplifier relative to the first amplifier, the second gain curve has a gain maxima and gain minima that is shifted with respect to the gain maxima and gain minima of the first gain curve.

Referring again to FIG. 7, the first amplifier generates a first periodic gain signal VS1 that is represented by the number 702. First periodic gain signal 702 has a repeating gain maxima 702a and a repeating gain minima 702b as indicated. A second amplifier generates a second periodic gain signal VS2 that is represented by the number 704. Second periodic gain signal 704 has a repeating gain maxima 704a and a repeating gain minima 704b. By shifting periods of the gain structures relative to one another by a set differential (e.g., such as $\pi$) such that gain maxima 704a substantially coincides with gain minima 702b, and gain maxima 702a substantially coincides with gain minima 704b, a combined gain ripple 706 is produced that is less (in terms of gain fluctuation) than the individual gain ripple produced from either the first or second amplifier alone. Consequently, one amplifier operates to equalize the gain signal from an adjacent amplifier. Accordingly, the amplifiers operate to perform automatic gain equalization for each channel of the system without the need for a separate equalizer(s) for the system.

The composite gain curve for the entire system can be further equalized by repeating this technique in subsequent amplifiers in the system. The first and second gain curves combine to form a third gain curve VS3 having a third gain maxima and a third gain minima of a third period. A third amplifier amplifies the optical signal having the third gain curve to produce a fourth gain curve with a fourth gain maxima and a fourth gain minima of a fourth period. The fourth gain maxima substantially coincides with the third gain minima while the fourth gain minima substantially coincides with the third gain maxima. As a result, the gain signal is further refined and represents an amplified optical signal with each channel having an equalized amount of gain as it is received by the receiving terminal.

In one embodiment of the invention the first, second and third amplifiers are raman amplifiers. Each raman amplifier utilizes a plurality of pumps. The pumps of the first amplifier operate at a first set of wavelengths, the pumps of the second amplifier operate at a second set of wavelengths, and the pumps of the third amplifier operate at a third set of wavelengths. In this embodiment of the invention, the first, second and third sets of wavelengths differ in a range between 5 and 50 nm between sets. In other words, each pump of the third amplifier is shifted between 5 to 50 nm from the corresponding pumps of the second amplifier, while each pump of the second amplifier is shifted between 5 to 50 nm from the corresponding pumps of the first amplifier. In one particular advantageous embodiment of the invention, the pumps from one amplifier are spaced 10 nm or less apart from the corresponding pumps of another adjacent amplifier. Each wavelength used by the respective pumps typically range between 1450 and 1650 nm.

Although various embodiments are specifically illustrated and described herein, it will be appreciated that modifications and variations of the present invention are covered by the above teachings and within the purview of the appended claims without departing from the spirit and intended scope of the invention. For example, the embodiments of the invention described above utilize optical amplifiers configured to provide raman amplification in accordance with a distributed amplification scheme. It can be appreciated, however, that optical amplifiers can be configured to provide raman amplification in accordance with a lumped amplification scheme and still fall within the scope of the invention. An example of a lumped raman amplifier is described in U.S. patent application Ser. No. 09/589,465 filed on Jun. 7, 2000 entitled METHOD AND APPARATUS TO PERFORM LUMPED RAMAN AMPLIFICATION and assigned to the assignee of the present application, the entirety of which is hereby incorporated by reference into the present application. In another example, the embodiments of the invention were described using a communication network. A communication network, however, can utilize an infinite number of network devices configured in an infinite number of ways. The communication network described herein is merely used by way of example, and is not meant to limit the scope of the invention.

What is claimed is:

1. An optical system to perform automatic gain equalization, comprising:

a first amplifier to amplify an optical signal to produce a first gain curve having a first gain maxima and a first gain minima of a first period;

a first set of amplifier pumps providing optical pump signals to said first amplifier;

a second amplifier to amplify said optical signal to produce a second gain curve with a second gain maxima and a second gain minima of a second period, with said second gain maxima substantially coinciding with said first gain minima;

a second set of amplifier pumps providing optical pump signals to said second amplifier, wherein said first and second gain curves form a third gain curve having a third gain maxima and a third gain minima of a third period;

a third amplifier to amplify said optical signal to produce a fourth gain curve with a fourth gain maxima and a fourth gain minima of a fourth period, with said fourth gain maxima substantially coinciding with said third minima, and a third set of amplifier pumps providing optical signals to said third amplifier, wherein said pumps of said first amplifier operate at a first set of wavelengths, said pumps of said second amplifier operate at a second set of wavelengths, and said pumps of said third amplifier operate at a third set of wavelengths.

2. The optical system of claim 1, wherein said second gain minima substantially coincides with said first gain maxima.

3. The optical system of claim 1, wherein said first and second periods are shifted by $\pi$.

4. The optical system of claim 1, wherein said first, second and third amplifiers are raman amplifiers utilizing a plurality of pumps.

5. The optical system of claim 4, wherein said raman amplifiers operate in accordance with one of a distributed amplification scheme and a lumped amplification scheme.

6. The optical system of claim 1, wherein said first, second and third sets of wavelengths differ in a range between 1 and 50 nanometers.

7. The optical system of claim 6, wherein said first, second and third sets of wavelengths are in a range between 1450 and 1650 nanometers.

8. A method to perform automatic gain equalization, comprising:

amplifying an optical signal via a first amplifier to produce a first gain curve having a first gain maxima and a first gain minima of a first period;

providing a first set of amplifier pump signals to said first amplifier, said pumps of said first amplifier operate at a first set of wavelengths;

amplifying said optical signal via a second amplifier to produce a second gain curve with a second gain maxima and a second gain minima of a second period, with said second gain maxima substantially coinciding with said first gain minima, wherein said first and second gain curves form a third gain curve having a third gain maxima and a third gain minima of a third period;

providing a second set of amplifier pump signals to said second amplifier, said pumps of said second amplifier operated at a second set of wavelengths;

amplifying said optical signal via a third amplifier to produce a fourth gain curve with a fourth gain maxima and a fourth gain minima of a fourth period, with said fourth gain maxima substantially coinciding with said third minima; and providing a third set of amplifier pump signals to said third amplifier, said pumps of said third amplifier operated at a third set of wavelengths.

9. The method of claim 8, wherein said second gain minima substantially coincides with said first gain maxima.

10. The method of claim 8, wherein said first and second periods are shifted by $\pi$.

11. The method of claim 1, wherein said first, second and third amplifiers are raman amplifiers.

12. The method of claim 11, wherein said raman amplifiers operate in accordance with one of a distributed amplification scheme and a lumped amplification scheme.

13. The method of claim 1, wherein said first, second and third sets of wavelengths differ in a range between 1 and 50 nanometers.

14. The method of claim 13, wherein said first, second and third sets of wavelengths are in a range between 1450 and 1650 nanometers.

* * * * *